(12) United States Patent
Gleichauf et al.

(10) Patent No.: US 6,499,107 B1
(45) Date of Patent: *Dec. 24, 2002

(54) METHOD AND SYSTEM FOR ADAPTIVE NETWORK SECURITY USING INTELLIGENT PACKET ANALYSIS

(75) Inventors: Robert E. Gleichauf, San Antonio, TX (US); Daniel M. Teal, San Antonio, TX (US); Kevin L. Wiley, Elgin, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/223,071

(22) Filed: Dec. 29, 1998

(51) Int. Cl.[7] .................................................. G06F 11/30
(52) U.S. Cl. ....................................................... 713/201
(58) Field of Search ................................. 713/200, 201; 709/223, 224, 229, 225, 100, 102, 103, 104, 226; 705/8, 9

(56) References Cited

U.S. PATENT DOCUMENTS

| | | | |
|---|---|---|---|
| 5,032,979 A | * | 7/1991 | Hecht et al. |
| 5,101,402 A | | 3/1992 | Chiu et al. ..................... 370/17 |
| 5,278,901 A | * | 1/1994 | Shieh et al. |
| 5,414,833 A | | 5/1995 | Hershey et al. ............. 395/575 |
| 5,448,724 A | | 9/1995 | Hayashi ................. 395/182.02 |
| 5,488,715 A | * | 1/1996 | Wainwright |
| 5,524,238 A | | 6/1996 | Miller et al. ................. 395/600 |
| 5,555,377 A | * | 9/1996 | Christensen et al. |
| 5,557,742 A | | 9/1996 | Smaha et al. ............... 395/186 |
| 5,606,668 A | | 2/1997 | Shwed .................. 395/200.11 |
| 5,621,889 A | | 4/1997 | Lermuzeaux et al. ....... 395/186 |
| 5,634,008 A | * | 5/1997 | Gaffaney et al. |
| 5,699,513 A | | 12/1997 | Feigen et al. .......... 395/187.01 |
| 5,751,964 A | * | 5/1998 | Ordanic et al. |
| 5,793,763 A | | 8/1998 | Mayes et al. ................ 370/389 |
| 5,796,942 A | * | 8/1998 | Esbensen |
| 5,798,706 A | | 8/1998 | Kraemer et al. ........ 340/825.07 |
| 5,805,801 A | | 9/1998 | Holloway et al. ...... 395/187.01 |
| 5,826,014 A | | 10/1998 | Coley et al. ........... 395/187.01 |
| 5,886,643 A | * | 3/1999 | Diebboll et al. |
| 5,919,257 A | | 7/1999 | Trostle ........................ 713/200 |
| 5,931,946 A | | 8/1999 | Terada et al. ................ 713/201 |
| 5,991,881 A | * | 11/1999 | Conklin et al. |
| 6,088,804 A | * | 7/2000 | Hill et al. |
| 6,108,310 A | * | 8/2000 | Wilkinson et al. |
| 6,128,642 A | * | 10/2000 | Doraswamy et al. |
| 6,279,113 B1 | * | 8/2001 | Vaidya |

OTHER PUBLICATIONS

US 6,304,668, 10/2001, Gleichauf et al. (withdrawn)*
Schuba, Analysis of a Denial of Service Attack on TCP, 1997, p. 208–233.*
"Introduction to Algorithms," by Thomas H. Cormen, Charles E. Leiserson, Ronald L. Rivest, Chap. 34, pp. 853–885, Copyright © 1990.
"Preliminary Report on Advanced Security Audit Trail Analysis on UNIX," N. Habra et al., pp. 1–34 (found at http://www.cs.purdue.edu/coast/archive/data/categ24.html), Sep. 1994.

(List continued on next page.)

*Primary Examiner*—Gail Hayes
*Assistant Examiner*—Jenise Jackson
(74) *Attorney, Agent, or Firm*—Baker Botts L.L.P.

(57) ABSTRACT

A method and system for adaptive network security using intelligent packet analysis are provided. The method comprises monitoring network data traffic. The network data traffic is analyzed to assess network information. A plurality of analysis tasks are prioritized based upon the network information. The analysis tasks are to be performed on the monitored network data traffic in order to identify attacks upon the network.

54 Claims, 4 Drawing Sheets

OTHER PUBLICATIONS

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html).

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html).

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16., (found at http://www.cs.purdue.edu/coast/archive/data/categ30.html).

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages., (found at http://www.cs.purdue.edu/coast/archive/data/categ30.html).

"Characteristics of Wide–Area TCP/IP Conversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference,* Oct. 1991, pp. 362–371., (found at http://seclab.cs.ucdavis.edu/papers.html), 1991.

"Internetwork Security Monitor: An Intrusion–Detection System for Large–Scale Networks", L.T. Heberlein et al., *Proc. of the 15th National Computer Security Conference,* Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2, 1999*, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlet (1998) pp. 1–27, (found at http://seclab.cs.ucdavis.edu/papers.html.), Oct. 17, 1998.

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Devanbu et al., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System",.Yip et al., *Proceedings of the Twelfth Annual IFIP WG 11.3 Working Conference on Database Security*, Chalkidiki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.), Mar. 13, 1997.

"Information Survivability, Security, and Fault Tolerance", Matt Bishop, position paper for the Information Survivability Workshop *Journal of Computer Security #6*) 1 page, (found at http://seclab.cs.ucdavis.edu/papers.html.), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. new Security Paradigms Workshop*, Cumbria UK 13 pages, (found at http://seclab.cs.ucdavis.edu/papers.html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers.html.), 1997.

"Cryptographic Verfication of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html.), 1997.

"Property–Based Testing; A New Approach to Testing for Assurance", Fink et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems 9*(2)., (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering of TCP Code: Vulnerability Analysis and Proposed Solutions, Guha et al., *Proc. of the IEEE Infocom '96*, San Francisco, CA (found at http://seclab.cs.ucdavis.edu/papers.html.), 1996.

"Attack Class: Address Spoofing", Heberlein et al., The 19th National Information Systems Security Conference, (found at http://seclab.cs.ucdavis.edu/papers.html.), 1996.

PhD. Theses entitled Execution Monitoring Of Security–Critical Programs In A Distributed System: A Specification––Based Approach, Calvin Cheuk Wang Ko, 111 pages, (found at http://seclab.cs.ucdavis.edu/papers.html.), 1996.

"A Methodology for Testing Intrusion Detection Systems", Puketza et al., *IEEE Transactions on Software Engineering*, vol. 22, No. 10, (found at http://seclab.cs.ucdavis.edu/papers.html.), 1996.

"The Exact Security of Digital Signatures–How to Sign with RSA and Rabin", Bellare et al. Earlier version appears in *Advances in Cryptology—Eurocrypt '96*, LNCS vol. 1070, U. Maurer ed., Springer–Verlag, pp. 399–416), (found at http://seclab.cs.ucdavis.edu/papers.html.), 1996.

"How to Protect DES Against Exhaustive Key Search", Kilian et al., Advances in Cryptology—CRYPTO '96., (found at http://seclab.cs.ucdavis.edu/papers.html.), 1996.

"GrIDS–A Graph Based Intrusion Detection System For Large Networks", Staniford–Chen et al., *The 19th NISSC*. 10 pages, (found at http://seclab.cs.ucdavis.edu/papers.html.), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html.), 1996.

"A Standard Audit Trail Format", Matt Bishop, *Proc. of the 1995 NISSC*, Baltimore, MD., (found at http://seclab.cs.ucdavis.edu/papers.html.), 1995.

Abstract entitled Theft of Information in the Take–Grant Protection Model, Matt Bishop, *Journal of Computer Security*, vol. 3, No. 4, (found at http://seclab.cs.ucdavis.edu/papers.html.), 1995.

"Improving System Security via Proactive Password Checking", Matt Bishop,*Computers & Security*, vol. 14, No. 3, pp. 233–249, (found at http://seclab.cs.ucdavis.edu/papers.html.), 1995.

"Simulating Concurrent Intrusions for Testing Intrusion Detection Systems: Parallelizing Intrustions", Chung et al., *Proc. of the 1995 NISSC*, Baltimore, MD, 11 pages, (found at http://seclab.cs.ucdavis.edu/papers.html.), 1995.

"Network Security Montitor", L. Todd Heberlein, *Lawrence Livermore National Laboratory project deliverable*, (found at http://seclab.cs.ucdavis.edu/papers.html.), 1995.

"Audit Log Analysis Using the Visual Audit Browser Toolkit", Hoagland et al., *U.C. Davis Computer Science Department Technical Report CSE–95–11,* (found at http://seclab.cs.ucdavis.edu/papers.html.), 1995.

"MCF: A Malicious Code Filter", R.W. Lo et al., *Computers & Security*, (1995) vol. 14, No. 6. (27 pages.), (found at http://seclab.cs.ucdavis.edu/papers.html.), 1995.

"Bucket Hashing and its Application to Fast Message Authentication", Phillip Rogaway, *Acvances in Cryptology—CRYPTO '95*, (found at http://seclab.cs.ucdavis.edu/papers.html.), 1995.

"Provably Secure Session Key Distribution–The Three Party Case", Bellare et al., *Proc. of the 27th Annual ACM Symposium on Theory of Computing*, Las Vegas, NV, (found at http://seclab.cs.ucdavis.edu/papers.html.), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html.), Oct. 1995.

"Holding Intruders Accountable on the Internet", Staniford-–Chen et al., *Proc. of the 1995 IEEE Symposium on Security and Privacy*, Oakland, CA, (11 pages) (found at http://seclab.cs.ucdavis.edu/papers.html.), 1995.

"LAFS: A Logging and Auditing File System", Christopher Wee, *Proc. of the 11th Computer Security Applications Conference,* 10 pages, (found at http://seclab.cs.ucdavis.edu/papers.html.), 1995.

"Towards a Property–based Testing Environment with Applications to Security–Critical Software", Fink et al., *Proc. of the 4th irvine Software Symposium.* 10 pages, (found at http://seclab.cs.ucdavis.edu/papers.html.), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html.), Dec. 1994.

"Artificial Intelligence and Intrusion Detection: Current and Future Directions", Jeremy Frank,*Proc. of the 17th National Computer Security Conference.* 12 pages, (found at http://seclab.cs.ucdavis.edu/papers.html.), 1994.

"Automated Detection of Vulnerabilities in Privileged Programs by Execution Monitoring", Ko et al.,*Proc. of the 10th Annual Computer Security Applications Conference*, Orlando, FL. (found at http://seclab.cs.ucdavis.edu/papers.html.), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html.), 1994.

"Network Intrusion Detection", Mukherjee et al., *IEEE Network*, May–Jun. 1994, vol. 8, No. 3, pp. 26–41. (found at http://seclab.cs.ucdavis.edu/papers.html.), 1994.

"A New Suggestion for How to Encrypt with RSA", Bellare et al., *Eurocrypt '94*, 20 pages, (found at http://seclab.cs.ucdavis.edu/papers.html.), 1994.

"The Security of Cipher Block Chaining", Bellare et al., *Advances in Cryptology—CRYPTO '94*, Santa Barbara CA. (19 pages.) (found at http://seclab.cs.ucdavis.edu/papers.html.), 1994.

"Analysis Of An Algorithm For Distributed Recognition And Accountability", Ko et al., *Proc. 1st ACM Conference on Computer and Communication Security.* Fairfax, VA, Nov. 1993, 11 pages, (found at http://seclab.cs.ucdavis.edu/papers.html.), 1993.

"Entity Authentication and Key Distribution". Bellare et al., *Advances in Cryptology—CRYPTO '93*, Santa Barbara, CA, Aug. 1993, pp. 232–249. (found at http://seclab.cs.ucdavis.edu/papers.html.), Aug. 1993.

"Random Oracles are Practical: A Paradigm for Designing Efficient Protocols", Bellare et al., *Proc. of the 1st ACM Conference on Computer and Communication Security*, Fairfax, VA, No. 1993, pp. 1545–164. (found at http://seclab.cs.ucdavis.edu/papers.html.), 1993.

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html.), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html.), 1992.

DIDS (Distributed Intrusion Detection System)—Motivation, Architecture, and An Early Prototype, Snapp et al., *Proc. 14th National Computer Security Conference*, Washington, DC (9 pages.) (found at http://seclab.cs.ucdavis.edu/papers.html.), 1991.

"Proactive Password Checking", Matt Bishop, *Proc. of the 7th International Conference on Information Security*, May 1991, pp. 169–181. (found at http://seclab.cs.ucdavis.edu/papers.html.), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html.), 1992.

Abstract entitled "Collaboration Using Roles" by M. Bishop, *Software—Practice and Experience*, vol. 20, No. 5, May 1990. (found at http://seclab.cs.ucdavis.edu/papers.html.), May 1990.

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers.html.), 1990.

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in a Security and Privacy*, Oakland, CA, May 7–9, 1990, pp. 86–94, (found at http://seclab.cs.ucdavis.edu/papers.html.), May 1990.

Abstract entitled "A Network Security Monitor" by L.T. Heberlein, G.V. Dias, K.N. Levitt, B. Mukherjee, and others*Proc. of the 1990 IEE Symposium on Research in Security and Privacy*, Oakland, CA, May 7–9, 1990, pp. 296–304, (found at http://seclab.cs.ucdavis.edu/papers.html.), May 1990.

Abstract entitled "Static Analysis Virus Detection Tools for UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers.html.), Oct. 1990.

Abstract entitled "Security with Low Communication Overhead" by D. Beaver, et al., *Proc. Advances in Cryptology—CRYPTO '90*, Santa Barbara, CA, Aug. 11–15, 1990, pp. 62–76, (found at http://seclab.cs.ucdavis.edu/papers.html.), Aug. 1990.

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers.html.), May 1990.

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html.), Oct. 1990.

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–135. (found at http://seclab.cs.ucdavis.edu/papers.html.), May 1991.

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html.), Jan. 1991.

Abstract entitled "Password Management" by M. Bishop, *COMPCON Spring '91. Digest of Papers*. San Francisco, CA, Feb. 25–Mar 1, 1991, pp. 167–169. (found at http://seclab.cs.ucdavis.edu/papers.html.), Mar. 1991.

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers.html.), Mar. 1993.

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html.), Mar. 1994.

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2.

NetRanger 1.3 User's Guide, Copyright © 1997 by WheelGroup Corporation, NetRanger product first available summer of 1996, 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www/cs.purdue.edu/coast/archive/data/categ30.html), Jul. 30, 1996.

* cited by examiner

METHOD AND SYSTEM FOR ADAPTIVE NETWORK SECURITY USING INTELLIGENT PACKET ANALYSIS

CROSS-REFERENCE TO RELATED APPLICATIONS

This application is related to U.S. patent application Ser. No. 09/223,072 entitled "Domain Mapping Method and System", filed Dec. 29, 1998, pending, and U.S. patent application Ser. No. 09/222,414 entitled "Method and System for Adaptive Network Security Using Network Vulnerability Assessment", filed Dec. 29, 1998, pending.

TECHNICAL FIELD OF THE INVENTION

The present invention relates in general to computer network security and, more particularly, to a system and method for adaptive network security using intelligent packet analysis.

BACKGROUND OF THE INVENTION

Network security products such as intrusion detection systems (ID systems) and firewalls can use a passive filtering technique to detect policy violations and patterns of misuse upon networks to which the Security products are coupled. The passive filtering technique usually comprises monitoring traffic upon the network for packets of data. A signature analysis or pattern matching algorithm is used upon the packets, wherein the packets are compared to "attack signatures", or signatures of known policy violations or patterns of misuse.

In order to properly detect policy violations and patterns of misuse, security products often must place the packets of data in contexts relevant to such connection criteria as space, time, and event. Space is usually defined in terms of a source-destination connection at the port level. Time is defined as the amount of time to continue associating packets for the type of connection defined by the source-destination connection. Event is defined as a type of connection, which in turn defines the types of policy and misuse signatures that can occur with each packet. As the size of a network expands, there are greater numbers of connections which leads to greater numbers of lookups and comparisons that must be performed by the security product.

Two problems are associated with conventional security products. First, conventional security products have insufficient information to self-configure for reliable detection of policy violations and patterns of misuse. For example, conventional security products have no mechanism to reliably ascertain network information of the network to which the security product is coupled. This leads to such disadvantages such as being unable to accurately predict the effect of a particular packet upon a destination device. Furthermore, a conventional security product has no mechanism to ascertain the network topology and thus cannot predict if a certain packet will reach its intended destination. Such a lack of network information compromises the security product's ability to detect such attacks such as insertion attacks, evasion attacks and denial of service attacks. Some of these problems with conventional security products are documented by Ptacek and Newsham, Insertion, Evasion, and Denial of Service: Eluding Network Intrusion Detection, Secure Networks Incorporated, January 1998.

A second problem associated with conventional security products is the result of scarcity of processor and memory resources. Conventional security products may begin to drop packets and shut down certain tasks in an unpredictable fashion once the system depletes its memory or processor resources. As the size of a network grows, such a failure becomes more likely, as the greater the number of connections onto the network requires a greater number of lookups and comparisons performed by the Security product. Additionally, an increase in number and complexity of the types of misuse the security product is required to detect can further degrade performance. An increase in traffic flow further drains a security product's resources. As a result, conventional ID systems cannot operate effectively at high network bandwidth utilization.

Some conventional systems have attempted to achieve performance gains by decreasing the number of misuse signatures the security product monitors. Fewer signatures translate into fewer memory comparisons for each packet that flows through the security product. However, such a solution makes a network more vulnerable to attacks.

Other conventional systems rely on the user to enumerate the network information, such as the types of operating systems and applications running on the protected network. These systems then disable certain misuse signatures accordingly.

Such a conventional solution, however, introduces additional problems. For example, if the user provides an inaccurate assessment of the network, then incorrect signatures may be disabled, meaning that undetected policy violations and network attacks are possible. Additionally, networks are rarely stable environments and the addition or deletion of devices or services can make the original network information supplied by the user inaccurate.

A further disadvantage of such conventional security products is that they are not designed to function in an environment wherein the traffic exceeds their memory or processor capacity. Such conventional systems, when confronted with traffic that exceeds their capacity, may start dropping packets and degrade performance in an unpredictable fashion. This can lead to an unknown security posture or profile, which can leave a network more vulnerable to undetected attacks.

SUMMARY OF THE INVENTION

In accordance with the present invention, a method and system for network security based upon intelligent packet analysis are disclosed that provide significant advantages over prior developed network security systems.

According to one aspect of the present invention, a method comprises monitoring network data traffic. The network data traffic is analyzed to assess network information. A plurality of analysis tasks are prioritized based upon the network information. The analysis tasks are to be performed on the monitored network data traffic in order to identify attacks upon the network.

In one embodiment, the method further includes monitoring a processor utilization and disabling a particular analysis task based upon an assigned priority of the particular analysis task if the processor utilization exceeds a first defined threshold.

In an additional embodiment, the method further includes re-enabling a disabled analysis task if the processor utilization drops below a second defined threshold.

According to another aspect of the invention, a system for adaptive network security using intelligent packet analysis, comprises an analysis engine coupled to a network. The analysis engine analyzes network data traffic to assess network information. A protocol engine is coupled to the network, and the protocol engine performs a plurality of protocol analyses on the network traffic to identify attacks upon the network. A signature engine is also coupled to the network. The signature engine compares the network traffic to a plurality of attack signatures to identify attacks upon the network. A priority engine is coupled to the analysis engine, the protocol engine, and the signature engine. The priority engine is for prioritizing the plurality of protocol analyses, the plurality of attack signatures based upon the network information.

According to another embodiment of the present invention, the priority engine can prioritize a plurality of system services based upon the network information.

It is a technical advantage of the present invention that it can more reliably detect policy violations and patterns of misuse because of the use of the network information.

It is another technical advantage of the present invention that it allows for the maintenance of a network map, which can allow for greater types of misuse patterns to be detected.

It is a further technical advantage of the present invention that it allows for a reliable and predictable prioritized shutdown of analysis tasks and services in the event resources are depleted.

It is another technical advantage of the present invention that effective intrusion detection can be had at higher network bandwidth utilization than conventional security systems.

It is another technical advantage that the present invention provides for adaptive network security, as the invention can adapt to a changing network environment and recalibrate in order to maintain a sufficient level of network security.

It is an additional technical advantage that the present invention can create and maintain network information in a network map without placing additional traffic upon the network.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
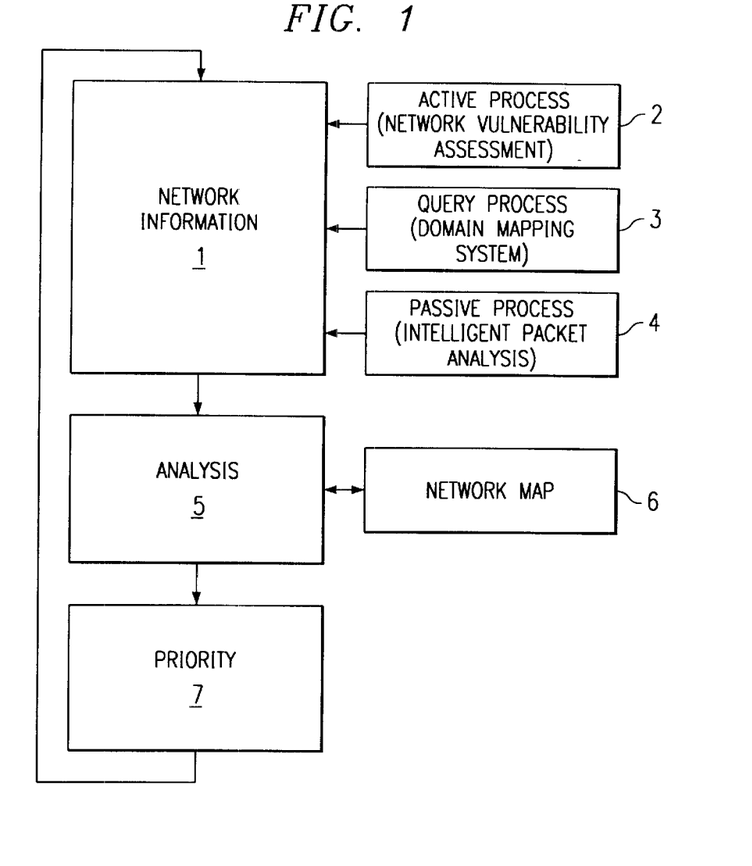
FIG. 1 is a flow diagram of various embodiments of a method of operation of a system for adaptive network security.

FIG. 1 is a flow diagram of various embodiments of a method of operation of a system for adaptive network security. An ID System is one such security system that could benefit from the adaptive network security system of the present invention.

In the method of FIG. 1, network information is acquired at step 1. Network information can comprise, for example, the devices, operating systems, and services available on a network.

In the embodiments of FIG. 1, such network information can be gathered by an active process 2, a passive process 4, or a query process 3. Active process 2 can include port scans, pinging, and other active methods performed on devices coupled to the network, as well as monitoring responses (such as banners) sent in response to such active methods. One such active process is described in the related U.S. patent application Ser. No. 09/222,414 entitled "Method and System for Adaptive Network Security Using Network Vulnerability Assessment", filed Dec. 29, 1998, pending. Query process 3 can comprise sending a query to a domain mapping service, wherein the domain mapping service maintains a compilation of network information. Such a domain mapping service can respond to such a request by sending the network information to a source of the request. Such a query system is described in the patent listed above, as well as described in U.S. patent application Ser. No. 09/223,072, entitled "Domain Mapping Method and System", filed Dec. 29, 1998, pending.

The third alternative to acquire network information is passive process 4. Passive process 4 allows a security device using the present invention to acquire network information without placing additional traffic on the network. One such passive process is an intelligent packet analysis. A method and system for adaptive network security using intelligent packet analysis is described more fully below.

Once network information is acquired, an analysis at step 5 is performed. For example, a network map 6 can be created to compile the network information. At step 7, a priority task is performed using the analysis of the network information at step 5. For example, an ID system using such a method can configure itself to perform high priority tasks based upon potential vulnerabilities of the network, as identified by the analysis at step 15.

The performance of steps 1, 5, and 7 can occur in one or more devices coupled to a network. For example, processes performing such tasks could be distributed among several devices in order to preserve processing resources. Alternatively, the processes performing such tasks could be integrated into a single device, such as an ID system, router, or firewall.

Figure 2:
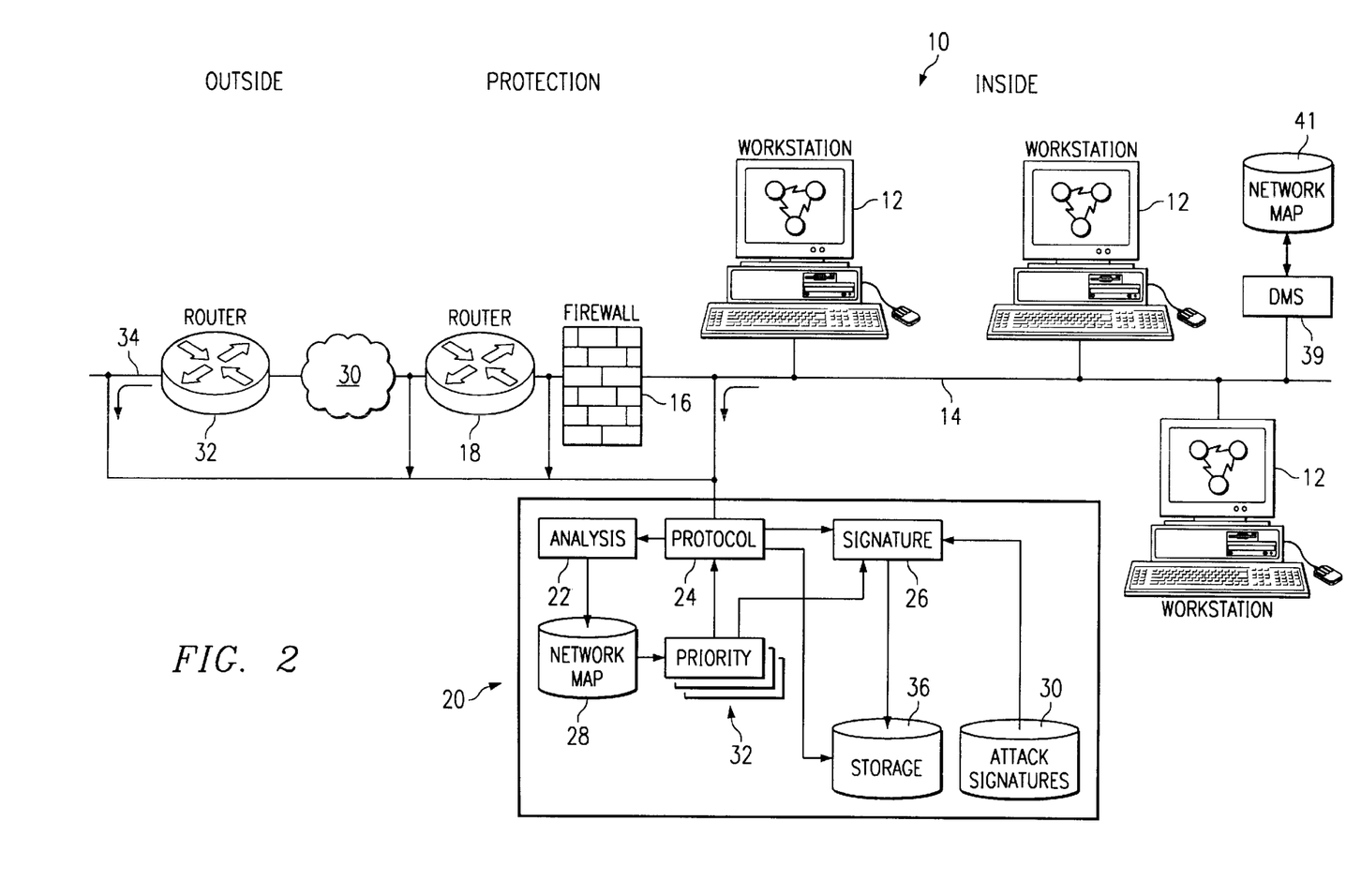
FIG. 2 is a block diagram of one embodiment of a network environment that includes a system for adaptive network security using intelligent packet analysis.

FIG. 2 is a block diagram of one embodiment of a network environment that includes a system for adaptive network security using intelligent packet analysis according to the present invention. As shown, the network environment can comprise devices that form an internal network, protection for the internal network, and an external network. The internal network, indicated generally at 10, can comprise a plurality of workstations 12 coupled to a network backbone 14. Network backbone 14 can comprise, for example, an Ethernet, FDDI, token ring, or other type of physical media type. Protection for internal network 10 can be provided by firewall 16 and a router 18 which are coupled to network backbone 14. Router 18 serves as a gateway between internal network 10 and an external network 30. External network 30 can be, for example, the Internet or other public network. Firewall 16 can serve to limit external access to resources in internal network 10 and protect these internal resources from unauthorized use.

Internal network 10 further comprises network security system 20 coupled to network backbone 14. Although FIG. 2 displays network security system 20 coupled to internal network 10 through network backbone 14, those skilled in the art will recognize network security system 20 can couple to internal network 10 in other ways, such as through workstation 12. Network security system 20 comprises a protocol engine 24 coupled to network backbone 14. An analysis engine 22 and a signature engine 26 each couple to protocol engine 24. Analysis engine 22 is further coupled to network map 28. Signature engine 26 is coupled to attack signatures 30. A priority engine 32 is coupled to network map 28, protocol engine 24 and signature engine 26. Protocol engine 24 and signature engine 26 each also couple to a storage 36.

In the embodiment of FIG. 2, network security system 20 is coupled directly to network backbone 14 "inside" internal network 10. Such a configuration is typical, for example, of an intrusion detection system. However, those skilled in the art will recognize that network security system 20 can be coupled to a network in other configurations. For example, network security system 20 could be incorporated into another device located on internal network 10, such as firewall 16 or router 18. Alternatively, as further shown in FIG. 2, network security system 20 could be coupled outside internal network 10, such as between firewall 16 and router 18, or outside router 18. It should be understood that different placement of network security system 20 will affect the its operation, as different placement exposes network security system 20 to different traffic on the network.

Network security system 20 can comprise, for example, software code executing on a computing device such as a SUN or INTEL based workstation. Network map 28 and attack signatures 30 can comprise data stored in memory or fixed storage on the workstation or other device in which network security system 20 resides. Storage 36 can comprise memory or fixed storage that is the same as or separate from the memory upon which network map 28 and/or attack signatures 30 reside. Alternatively, some or all of storage 36 and the data that comprises network map 28 and attack signatures 30 could reside in fixed storage remote from the location of network security system 20. Similarly, analysis engine 22 could comprise software code executing remotely from the device upon which network security system 20 resides. One example of such an alternate configuration, for example, is shown in FIG. 2 as a domain mapping system 39 and network map 41.

In operation, devices such as workstations 12 can communicate over network backbone 14. Workstations 12 can further communicate with external network 30 via network backbone 14 and router 18. As mentioned above, firewall 16 is intended to prevent unauthorized access from external network 30 to devices coupled to internal network 10. However, firewall 16 may not capable of preventing all unauthorized access. As used with respect to this application, "attack" is used to describe any type of unauthorized access, policy violation, or pattern of misuse.

Further in operation, network security system 20 is operable to detect attacks upon internal network 10. Network security system 20 accomplishes this by monitoring traffic on network backbone 14 and performing analysis tasks upon the monitored traffic in the context of network information discovered from internal network 10. In the embodiment of FIG. 2, protocol engine 24 monitors the traffic for packets of data, analysis engine 22 analyzes the packets to assess network information, while protocol engine 24 and signature engine 26 perform analysis tasks upon the monitored traffic.

Analysis engine 22 couples to protocol engine 24 and can an analyze the traffic to assess network information. For example, analysis engine 22 could monitor the types of services being accessed on certain devices by analyzing the content of packets addressed to the device in question. The services could be deduced by maintaining service state tables based upon the types of packets that pass through the monitored network.

Additionally, in the embodiment of FIG. 2, analysis engine 22 is operable to analyze the network information to identify potential vulnerabilities of internal network 10. For example, analysis engine 22 could perform a rules-driven assessment on the network information that analysis engine 22 has detected. Such an assessment could comprise, for example, a portion of the rules-driven multi-phase network vulnerability assessment described in U.S. patent application Ser. No. 09/107,964, entitled "System and Method for Rules-Driven Multi-Phase Network Vulnerability Assessment," filed Jun. 30, 1998, the disclosure of which is herein incorporated by reference.

Analysis engine 22 can further create a network map 28 which can include such network information discovered by analysis engine 22. Network map 28 can comprise, for example, a multi-dimensional database with a real-time data insertion, as described in U.S. patent application Ser. No. 09/107,790, entitled "System and Method for Real-Time Insertion of Data Into a Multi-Dimensional Database for Network Intrusion Detection and Vulnerability Assessment," filed Jun. 30, 1998, pending, the disclosure of which is incorporated herein by reference.

Further in operation, protocol engine 24 performs a plurality of protocol analyses upon monitored traffic on network backbone 14 in order to detect attacks upon the network. Attacks upon the network, as mentioned above, are defined herein to include unauthorized accesses, policy violations, and patterns of misuse. Protocol engine 24 can perform, for example, the following protocol analyses upon monitored traffic on network backbone 14: checksum verification (IP, TCP, UDP, ICMP, etc.), IP fragment reassembly, TCP stream reassembly, protocol verification (such as insuring the IP header length is correct and the TCP data gram is not truncated), and timeout calculations.

Signature engine 26 is coupled to protocol engine 24 and can perform further analysis tasks on the network data traffic in order to detect attacks upon internal network 10. Signature engine 26 compares the packets of monitored network data traffic with attack signatures 30. Attack signatures 30 can comprise, for example, a rules-based hierarchy of traffic signatures of known policy violations. Signature engine 26 can compare packets from the network data traffic with such attack signatures 30 such that policy violations can be discovered.

Further in operation, priority engine 32 uses the network information maintained in network map 28 to prioritize the analysis tasks performed by the protocol engine 24 and the signature engine 26. For example, priority engine 32 could determine a likelihood of success of a particular attack upon the network based upon the network information. Priority engine 32 could then prioritize the protocol analysis performed by protocol engine 24 that is intended to detect that particular attack. Likewise, priority engine 32 could prioritize attack signatures 30 based upon the network information in network map 28 according to the likelihood of success of each attack associated with each attack signature 40. In one embodiment, priority engine 32 could compile a prioritized task list comprising a list of all such analysis tasks, ranked by an assigned priority to each task.

Additionally, priority engine 32 could prioritize system services performed by network security system 20. Such system services could include, for example, IP logging, traffic logging, alarm notifications, and communications among others.

Further in operation, priority engine 32 can monitor a memory utilization of memory resources and a processor utilization of processor resources. If the processor utilization exceeds a first defined threshold, priority engine 32 disables an analysis task. As used herein, analysis task could comprise a protocol analysis performed by protocol engine 24 or a particular attack signature 40 as used by signature engine 26. Priority engine 32 can make the disable decision based upon an assigned priority of each task, as discussed previously. Then, as processor utilization dropped below a second defined threshold, priority engine 32 could reenable the a disabled analysis task. Similarly, priority engine 32 could disable a particular analysis task or system service if memory utilization exceeded a third defined threshold, or reenable a disabled analysis task if memory utilization drops below a fourth defined threshold.

The results of the protocol analysis provided by protocol engine 24 and signature analysis provided by signature engine 26 are recorded in storage 36. The results could then be made available, for example, to another process or a system administrator.

Network security system 20 is adaptive because it can configure or reconfigure by prioritizing the protocol analyses, the attack signatures, or its system services according to changes in network information.

Figure 3:
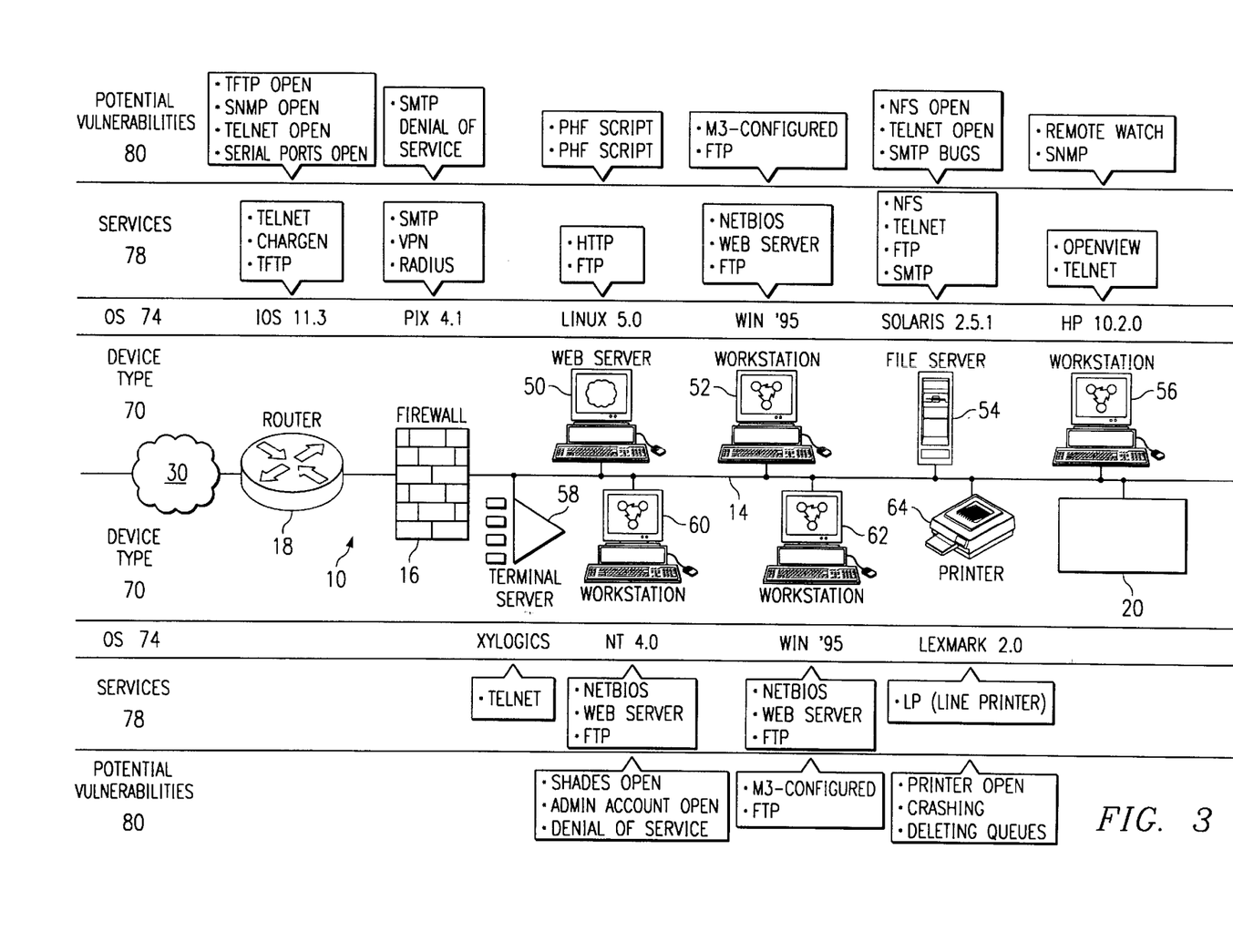
FIG. 3 is a block diagram showing network information of one embodiment of a network that includes a system for adaptive network security using intelligent packet analysis.

FIG. 3 is a block diagram showing network information of one embodiment of a network that includes a system for adaptive network security using network intelligent packet analysis. This diagram also shows the dimensionality of a network and its devices in terms of device types 70, operating systems 74, services 78 and potential vulnerabilities 80. Such dimensionality, for example, could comprise the network information discovered by network security system 20 and stored in an associated network map. Internal network 10 of FIG. 3 comprises numerous devices, including router 28, firewall 16, web server 50, workstations 52, 56, 60 and 62, file server 54, printer 64, and terminal server 58. Each of these devices is coupled to network backbone 14. Similar to FIG. 2, network security system 20 is coupled to network backbone 14.

In operation, as discussed with respect to FIG. 2 network security system 20 monitors network data traffic and analyzes the traffic to assess network information of internal network 10. As further discussed with respect to FIG. 2, network security system 20 can discover network information such as device types 70, operating systems 74, and services 78 on internal network 10. Additionally, network security system 20 of FIG. 3 can make an assessment of potential vulnerabilities 80 associated with each device on internal network 10.

All such network information can be incorporated into network map 28 (FIG. 2). Priority engine 32, further as discussed with respect to FIG. 2, can use the information in network map 28 to prioritize the analysis tasks to be performed on monitored traffic by protocol engine 24 and signature engine 26.

Figure 4:
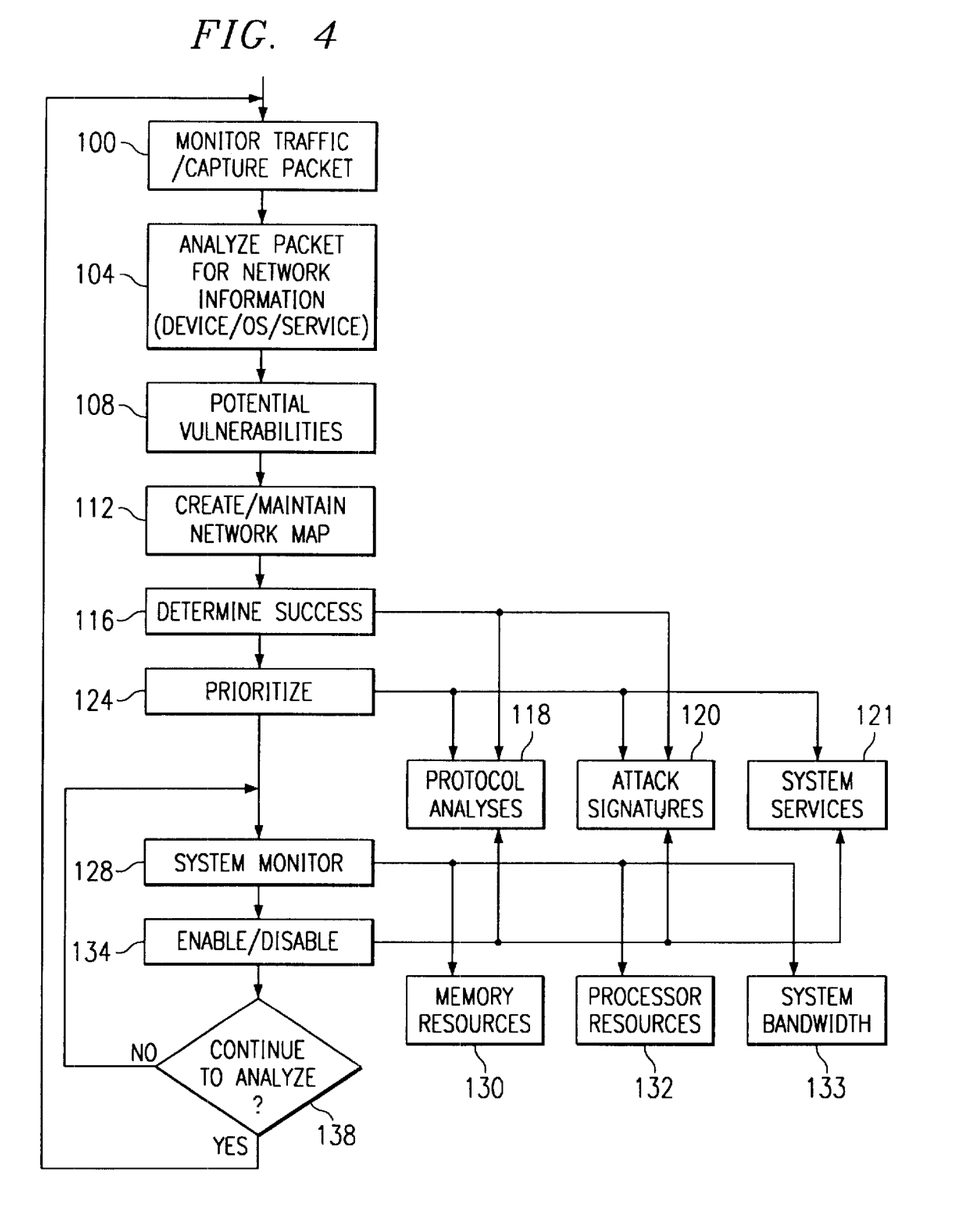
FIG. 4 is a flow diagram of one embodiment of a method for adaptive network security using intelligent packet analysis.

FIG. 4 is a flow diagram of one embodiment of a method for adaptive network security using intelligent packet analysis. At step 100, network data traffic is monitored on the network. Network data traffic can comprise, for example, packets exchanged between devices on the network. Each such packet can be "captured" at step 100. At step 104, the traffic or packet is analyzed to discover network information and count attributes. Such network information can comprise, for example, devices coupled to the network, operating systems running on the devices, and services available on the devices. Such a step could be accomplished, for example, by maintaining service state tables based on the types of packets that pass through the network.

At step 108, potential vulnerabilities associated with devices coupled to the network are determined. For example, this step could comprise a rules-based comparison between the discovered network information, and known problems associated with networks that contain such configurations. Such a comparison is described, for example, in U.S. patent application Ser. No. 09/107,964. At step 112, the discovered network information is used to create and maintain a network map.

At step 116, a probable success of a particular attack upon the network is determined. In order to make such a determination, the network information stored in the network map can be applied to both protocol analyses 118 and attack signatures 120. For example, protocol analyses can comprise checksum verification, protocol verification, IP fragment reassembly, and TCP stream reassembly, as discussed above. Each of the above protocol analyses 118 can be intended to discover a particular type of attack. Depending upon the network information stored in the network map, it can be determined whether or not an attack that is discovered by such a protocol analysis has a certain probability of success. Likewise, each of the attack signatures 120 are designed to detect a particular type of attack upon the network. The network information contained in network map can assist in determining the probability of success of each potential attack as defined by its associated attack signature.

At step 124, the analysis tasks and system services are prioritized. Protocol analyses 118 and attack signatures 120 are assigned a priority based upon the determined probability of success performed at step 116. System services 121 are prioritized based upon a level of criticality of each service as can be determined from the network information. System services 121 include services performed by the security device such as: IP logging, event logging, or alarm sounding. The prioritizing of such services is based upon the network information, as the network information determines the level of necessity of each system service.

At step 128, system monitoring is performed. The system monitoring is performed to discover a memory utilization of memory resources at step 130, a processor utilization of processor resources at step 132, and an overall system bandwidth 133. System bandwidth 133 might be particularly affected under a denial of service attack, for example.

At step 134, an enable/disable function is performed. For example, if the processor utilization has exceeded a particular threshold, for example 90%, a particular analysis task (either a protocol analysis 118 or a particular attack signature 120) can be disabled. Alternatively or additionally, a particular system service 121 may be disabled. This particular analysis task can be reenabled if the processor utilization drops below a second defined threshold, for example 85%. Similarly, if the memory utilization exceeds a third defined threshold, a particular analysis task can be disabled. If the memory utilization subsequently drops below a fourth defined threshold, the particular analysis task can be reenabled.

By enabling or disabling system services 121 at step 134, the security system implementing such functionality can adapt to a changing network environment. The systems that a security system performs can be referred to as a configuration of the security system. As the network information drives the services performed by the security system, the security system is able to configure and reconfigure itself as the network dynamics dictate.

At step 138 it is determined if the analyzing for network information should be repeated. If so, the method returns to step 100 to discover updated network information, and the method is repeated. By obtaining updated network information, and then repeating the prioritizing steps using the updated network information, the method can adapt to a changing network environment.

Figure 5A:
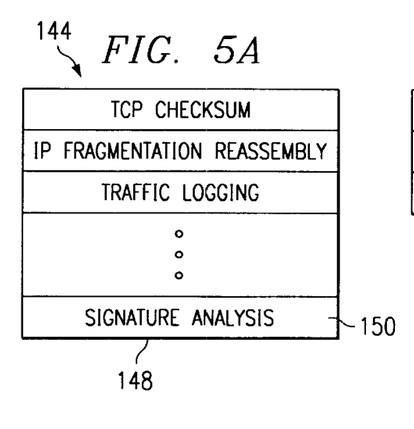
FIGS. 5A, 5B, and 5C are block diagrams of embodiments of a prioritized task list, a prioritized attack signature list, and a prioritized system services list, respectively.
Figure 5B:
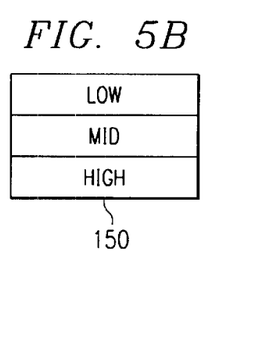
Figure 5C:
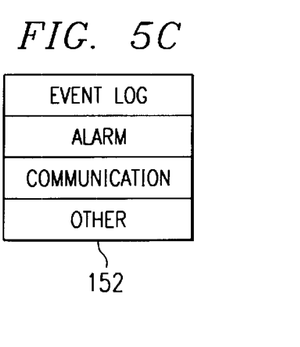

FIGS. 5A, 5B, and 5C are block diagrams of embodiments of a prioritized task list, a prioritized attack signature list, and a prioritized system services list, respectively. In FIG. 5A, a prioritized task list, indicated at 144, comprises a plurality of analysis tasks 148. Prioritized task list 144 includes both types of analysis tasks: protocol analyses and signature analysis 150. The analysis tasks, as discussed above, are intended to identify particular attacks upon the network and can include both protocol analysis and comparisons between network traffic and known attack signatures. In the embodiment of FIG. 5A, the analysis tasks have been prioritized from the least important (TCP checksum) to the most important (signature analysis 150), according to the network information of a particular network.

FIG. 5B is a prioritized attack signature list 150, and FIG. 5C is a prioritized system services list 152. Similar to prioritized task list 144, prioritized attack signature list 150 and prioritized system services list 152 are created based upon network information gathered from a network that the security system is coupled to.

For example, the priority engine 32 (FIG. 2) may construct prioritized task list 144. Then, if memory or processor resources are depleted, the priority engine can disable certain analysis tasks 148, beginning with the least important, until the memory or processor utilization is at a safe operating threshold. It should be understood, however, that the present invention contemplates that in some circumstances, analysis tasks could be disabled or re-enabled "out of order", that is, not according to an assigned priority. Such could occur, for example, upon a user intervention or upon the presentation of a particular attack. For example, if an attacker launches an IP fragment DOS attack against the network security system, the system should detect the attack through the IP fragment reassembly analysis task. The system then may disable IP fragment reassembly for some or all other fragments and issue an alarm about the attack.

Further in operation, once it is determined that an attack signature must be disabled, as shown in FIG. 5B, low priority attack signatures can be disabled before higher priority attack signatures. Additionally, as shown in FIG. 5C, system services prioritized and disabled accordingly.

The present invention further contemplates that in some instances it may be desirous to disable certain tasks regardless of memory or processor utilization. Such an instance could occur, for example, if a user wished to disable all attack signatures made irrelevant by the network information discovered on the network.

Although the present invention has been described in detail, it should be understood that various changes, substitutions and alterations can be made thereto without departing from the spirit and scope of the invention as defined by the appended claims.

What is claimed is:

1. A computer implemented method for adaptive network security using intelligent packet analysis, comprising:
   monitoring network data traffic;
   analyzing the network data traffic to assess network information;
   prioritizing a plurality of analysis tasks based upon the network information, the analysis tasks to be performed on the monitored network data traffic in order to identify attacks upon the network;
   wherein the plurality of analysis tasks includes a plurality of comparisons between the monitored network data traffic and a plurality of attack signatures; and
   disabling a particular attack signature based upon an assigned priority of the particular attack signature.

2. The method of claim 1, further comprising disabling a particular analysis task based upon an assigned priority of the particular analysis task.

3. The method of claim 2, further comprising:
   monitoring a processor utilization; and
   performing the disabling step if the processor utilization exceeds a first defined threshold.

4. The method of claim 3, further comprising re-enabling the particular analysis task if the processor utilization drops below a second defined threshold.

5. The method of claim 2, further comprising:
   monitoring memory utilization; and
   performing the disabling step if the memory utilization exceeds a third defined threshold.

6. The method of claim 5, further comprising re-enabling the particular analysis task if the memory utilization drops below a fourth defined threshold.

7. The method of claim 1, wherein the prioritizing step comprises:
   determining a probable success of a particular attack upon the network based upon the network information; and
   assigning a priority to the particular analysis task intended to detect the particular attack.

8. The method of claim 1, further comprising:
   comparing the network information to existing network information to determine updated network information; and
   repeating the prioritizing step using the updated network information.

9. The method of claim 1, further comprising:
   prioritizing a plurality of system services based upon the network information; and
   disabling a particular system service based upon an assigned priority of the particular system service.

10. The method of claim 1, wherein the analyzing step comprises determining a device coupled to the network.

11. The method of claim 1, wherein the analyzing step comprises determining an operating system of a device coupled to the network.

12. The method of claim 1, wherein the analyzing step comprises determining a service of a device available to the network.

13. The method of claim 1, wherein the analyzing step further comprises identifying a potential vulnerability of a device on the network.

14. The method of claim 1, further comprising maintaining the network information in a network map.

15. The method of claim 1, wherein the plurality of analysis tasks includes protocol analysis on the monitored traffic.

16. The method of claim 15, wherein the plurality of analysis tasks includes checksum verification.

17. The method of claim 15, wherein the plurality of analysis tasks includes IP fragment reassembly.

18. The method of claim 15, wherein the plurality of analysis tasks include TCP stream reassembly.

19. The method of claim 15, wherein the plurality of analysis tasks includes timeout calculations.

20. A computer method for adaptive network security using intelligent packet analysis, comprising:

monitoring network data traffic;

analyzing the network data traffic to assess network information;

prioritizing a plurality of protocol analyses to be performed on monitored traffic from the network, the protocol analyses for identifying attacks upon the network;

monitoring a processor utilization;

monitoring memory utilization;

disabling a particular protocol analysis based upon an assigned priority if the processor utilization exceeds a first defined threshold; and disabling a particular protocol analysis based upon an assigned priority if the memory utilization exceeds a third defined threshold.

21. The method of claim 20, wherein the analyzing step comprises determining the existence of a device coupled to the network from a packet of monitored network data traffic.

22. The method of claim 20, wherein the analyzing step comprises determining an operating system running on a device coupled to the network from the monitored network data traffic.

23. The method of claim 20, wherein the analyzing step comprises determining a service of a device coupled to the network from the monitored network data traffic.

24. The method of claim 20, further comprising identifying potential vulnerabilities of each device discovered to be coupled to the network.

25. The method of claim 20, further comprising re-enabling a disabled protocol analysis if the processor utilization drops below a second defined threshold.

26. The method of claim 20, further comprising re-enabling a protocol analysis if the memory utilization drops below a fourth defined threshold.

27. The method of claim 20, wherein the plurality of protocol analyses includes checksum verification.

28. The method of claim 20, wherein the plurality of protocol analyses includes IP fragment reassembly.

29. The method of claim 20, wherein the plurality of protocol analyses includes TCP stream reassembly.

30. The method of claim 20, wherein the plurality of protocol analyses includes timeout calculations.

31. The method of claim 20, further comprising:

comparing the network information to existing network information to determine updated network information; and updating the prioritizing step using the updated network information.

32. The method of claim 20, further comprising:

prioritizing a plurality of system services based upon the network information; and disabling a particular system service based upon an assigned priority of the particular system service.

33. A computer implemented method for adaptive network security using intelligent packet analysis, comprising:

monitoring network data traffic;

analyzing the network data traffic to assess network information;

prioritizing a plurality of comparisons between monitored network data traffic and a plurality attack signatures based upon the network information, the attack signatures for identifying attacks upon the network;

monitoring a processor utilization;

monitoring memory utilization;

disabling a particular attack signature based upon an assigned priority if the processor utilization exceeds a first defined threshold; and disabling a particular attack signature based upon an assigned priority if the memory utilization exceeds a third defined threshold.

34. The method of claim 33, wherein the prioritizing step comprises:

determining a likelihood of success of a potential attack based upon the network information; and prioritizing an attack signature of the potential attack according to the determined likelihood of success.

35. The method of claim 33, wherein the analyzing step comprises determining the existence of a device coupled to the network from monitored network data traffic.

36. The method of claim 33, wherein the analyzing step comprises determining an operating system type of a device coupled to the network from monitored network data traffic.

37. The method of claim 33, wherein the analyzing step comprises determining a service of a device coupled to the network from a packet monitored network data traffic.

38. The method of claim 33, further comprising identifying potential vulnerabilities of each device discovered to be coupled to the network.

39. The method of claim 33, further comprising re-enabling a disabled comparison if the processor utilization drops below a second defined threshold.

40. The method of claim 33, further comprising re-enabling a disabled comparison if the memory utilization drops below a fourth defined threshold.

41. The method of claim 33, further comprising maintaining the network information in a network map.

42. The method of claim 33, further comprising:

comparing the network information to existing network information to determine updated network information; and repeating the prioritizing step using the updated network information.

43. The method of claim 33, further comprising:

prioritizing a plurality of system services based upon the network information; and disabling a particular system service based upon an assigned priority of the particular system service.

44. A system for adaptive network security using intelligent packet analysis, comprising:

an analysis engine coupled to a network, the analysis engine for analyzing network data traffic to assess network information;

a protocol engine coupled to the network, the protocol engine for performing a plurality of protocol analyses on the network data traffic to identify attacks upon the network;

a signature engine coupled to the network, the signature engine for comparing the network data traffic to a plurality of attack signatures to identify attacks upon the network; and a priority engine coupled to the analysis engine, the protocol engine, and the signature engine, the priority engine for prioritizing the plurality of protocol analyses and the plurality of attack signatures based upon the network information.

45. The system of claim 44, further comprising a network map coupled to the analysis engine and the priority engine;

wherein the analysis engine is operable to maintain the network information in the network map.

46. The system of claim 44, wherein the priority engine is further operable to disable a particular analysis task based upon an assigned priority of the particular analysis task.

47. The system of claim 44, wherein the priority engine is further operable to:

monitor a processor utilization; and disable the particular analysis task if the processor utilization exceeds a first defined threshold.

48. The system of claim 47, wherein the priority engine is further operable to re-enable the particular analysis task if the processor utilization drops below a second defined threshold.

49. The system of claim 44, wherein the priority engine is further operable to:

monitor memory utilization; and disable the particular analysis task if the memory utilization exceeds a third defined threshold.

50. The system of claim 49, wherein the priority engine is further operable to re-enable the particular analysis task if the memory utilization drops below a fourth defined threshold.

51. The system claim 44, wherein the priority engine is further operable to:

determine a probable success of a particular attack upon the network based upon the network information; and assign a priority to the particular analysis task intended to detect the particular attack.

52. The system of claim 44, wherein the network information comprises:

a device coupled to the network;

an operating systems running on the device; and services available on the device.

53. The system of claim 52, wherein the network information further comprises a potential vulnerability of the device on the network.

54. The system of claim 44, wherein the priority engine is further operable to prioritize a plurality of system services based upon the network information.

* * * * *